US011008465B2

(12) United States Patent
Ryu et al.

(10) Patent No.: US 11,008,465 B2
(45) Date of Patent: May 18, 2021

(54) UV CURABLE COATING COMPOSITION

(71) Applicant: KCC CORPORATION, Seoul (KR)

(72) Inventors: Suk Hwa Ryu, Gyeonggi-do (KR);
Kyu Yeob Park, Gyeonggi-do (KR);
Kang Soo Kim, Gyeonggi-do (KR)

(73) Assignee: KCC CORPORATION, Seoul (KR)

( * ) Notice: Subject to any disclaimer, the term of this patent is extended or adjusted under 35 U.S.C. 154(b) by 0 days.

(21) Appl. No.: 16/649,762

(22) PCT Filed: Sep. 19, 2018

(86) PCT No.: PCT/KR2018/011058
§ 371 (c)(1),
(2) Date: Mar. 23, 2020

(87) PCT Pub. No.: WO2019/066367
PCT Pub. Date: Apr. 4, 2019

(65) Prior Publication Data
US 2020/0239700 A1 Jul. 30, 2020

(30) Foreign Application Priority Data
Sep. 26, 2017 (KR) ........................ 10-2017-0124160

(51) Int. Cl.
| C08F 2/46 | (2006.01) |
| C08F 2/50 | (2006.01) |
| C08G 61/04 | (2006.01) |
| C09D 4/06 | (2006.01) |
| C09D 7/48 | (2018.01) |
| C08F 220/34 | (2006.01) |
| C08F 2/48 | (2006.01) |
| C08F 220/18 | (2006.01) |
| C08K 5/07 | (2006.01) |

(52) U.S. Cl.
CPC ................. *C09D 4/06* (2013.01); *C08F 2/48* (2013.01); *C08F 220/18* (2013.01); *C08F 220/343* (2020.02); *C08K 5/07* (2013.01); *C09D 7/48* (2018.01)

(58) Field of Classification Search
CPC ... C09D 7/63; C09D 7/48; C09D 7/40; C09D 4/06; C09D 4/00; C09D 5/00; C08K 5/07; C08F 220/18; C08F 220/343; C08F 2/48
USPC ........................ 522/6, 71, 189, 184, 1; 520/1
See application file for complete search history.

(56) References Cited

U.S. PATENT DOCUMENTS

2016/0108277 A1* 4/2016 Kim ........................ C09D 4/00
428/423.1

FOREIGN PATENT DOCUMENTS

| JP | 2005-298619 | * 10/2005 |
| JP | 2005-298619 A | 10/2005 |
| JP | 2007-284485 A | 11/2007 |
| KR | 1020060072476 | * 12/2004 |
| KR | 10-2006-0072476 A | 6/2006 |
| KR | 10-2016-0139206 A | 12/2016 |
| KR | 1020160139206 | * 12/2016 |
| KR | 10-2017-0095787 A | 8/2017 |
| KR | 1020170095787 | * 8/2017 |

OTHER PUBLICATIONS

Kim et al, KR 1020060072476 Machine Translation, Dec. 23, 2004 (Year: 2004).*
Kakinuma et al, JP 2005-298619 Machine Translation, Oct. 27, 2005 (Year: 2005).*
Kakinuma et al, JP 2005-298619 Chart translation, Oct. 27, 2005 (Year: 2005).*
Paik et al, KR 1020170095787 Machine Translation, Aug. 23, 2017 (Year: 2017).*
Choi et al, KR 1020160139206 Machine Translation, Dec. 7, 2016 (Year: 2016).*

* cited by examiner

*Primary Examiner* — Jessica Whiteley
(74) *Attorney, Agent, or Firm* — Muncy, Geissler, Olds & Lowe, P.C.

(57) ABSTRACT

The present invention relates to a high solid type ultraviolet-curable coating composition and a molded product comprising a cured coating layer formed using the same. The present invention provides an eco-friendly UV-curable coating composition having less generation of volatile organic compounds.

12 Claims, No Drawings

UV CURABLE COATING COMPOSITION

BACKGROUND

Field

The present invention relates to an ultraviolet-curable coating composition and a molded product comprising a cured coating layer formed using the same.

Description of the Related Art

A coating composition used for the hard coating of a molded product of a plastic material for a vehicle, for example, an automotive headlamp polycarbonate (PC) lens, is required to have excellent productivity, adhesion, water resistance, weather resistance, and the like. In addition, in the case of a coating composition for parts of a vehicle, excellent appearance, workability, and productivity may be ensured when coating is performed by a method such as air spray coating. A coating composition for air spraying or flow coating has a low solid content and a relatively high solvent content, and thus, has a problem in that a lot of volatile organic compounds are generated when coating is performed at places in which environmental equipment is not provided, thereby causing environmental pollution.

A volatile organic compound refers to a liquid or gaseous volatile organic compound which has a high vapor pressure, and thus are easily evaporated into the atmosphere. A volatile organic compound causes a photochemical reaction in the atmosphere, thereby causing the generation of a photochemical oxidizing substance such as ozone, and photochemical smog, and is also a carcinogen. Therefore, in recent years, regulations on the content of volatile organic compounds have become strict in developed countries such as Europe in particular, and according to the regulations, there are problems in that not only the operation of equipment for removing volatile organic compounds is required, but also disposal costs and environmental costs are continuously generated.

As a method for reducing volatile organic compounds, there is a technique for using a water-based coating using water as a solvent, a powder coating not using a solvent at all, and a high solid type coating having an increased solid content of a coating. However, in case of a typical high solid type coating, it is difficult to reduce the content of volatile organic compounds while securing workability and coating properties (appearance, drying time, adhesion, and the like).

SUMMARY

The present invention relates to a high solid type ultraviolet-curable coating composition, wherein a solid content of 70% or greater. The present invention provides an eco-friendly UV-curable coating composition having improved low-workability due to reduced solvent content and having less generation of volatile organic compounds while the basic properties of a typical coating composition are secured.

The present invention provides an ultraviolet-curable coating composition comprising a urethane (meth)acrylate oligomer, a (meth)acrylate monomer, a photoinitiator, and a solvent, wherein the urethane (meth)acrylate oligomer comprises the first urethane (meth)acrylate oligomer having 5 or more functional groups and the second urethane (meth) acrylate oligomer having 4 or less functional groups.

The present invention also provides a molded product (for example, a lens for a head lamp of a vehicle) provided with a cured coating layer formed from the ultraviolet-curable coating composition.

By applying a high solid type coating according to the present invention, the content of volatile organic compounds is reduced so that environmental pollution is reduced, while low-workability due to reduced solvent content is improved. Also, due to a high solid content, coating properties such as excellent drying properties, adhesion, heat resistance, moisture resistance, heat and cold resistance, appearance properties are secured.

In addition, the high solid type coating according to the present invention may satisfy not only domestic environmental regulations of volatile organic compounds in the regulatory standards consultation of Ministry of Environment but also overseas environmental regulatory standards to be strengthened, and may improve productivity and economic feasibility by using conventional environmental equipment and minimizing maintenance costs.

In addition, the high solid type coating according to the present invention may be recycled, thereby minimizing the generation of coating waste, so that productivity and economic feasibility may be improved.

DETAILED DESCRIPTION

Hereinafter, the present invention will be described in detail. However, the present invention is not limited only to the following contents. If necessary, each component may be variously modified or optionally combined. Therefore, it is to be understood that all changes, equivalents, and alternatives falling within the spirit and scope of the present invention are intended to be included.

In the present specification, the term "(meth)acrylate" refers to acrylate and methacrylate. Also, in the present specification, the term a "monomer" is distinguished from an "oligomer" and a "polymer." In the present specification, the term a "polymerizable functional group" refers to an "unsaturated group" involved in a polymerization reaction, such as a (meth)acrylate group.

<Ultraviolet (UV)-Curable Coating Composition>

An ultraviolet-curable coating composition according to the present invention is a photo-curable composition comprising a photo-curable oligomer, a photo-curable monomer, and a photoinitiator, wherein two kinds of multifunctional urethane (meth)acrylate oligomers are used as the photo-curable oligomer, and a (meth)acrylate monomer is used as the photo-curable monomer. If necessary, typical additives such as an ultraviolet absorber, a light stabilizer, and a leveling agent may be further included.

According to one embodiment of the present invention, the ultraviolet-curable coating composition comprises a urethane (meth)acrylate oligomer, a (meth)acrylate monomer, a photoinitiator, and a solvent, wherein the urethane (meth) acrylate oligomer comprises the first urethane (meth)acrylate oligomer having 5 or more functional groups and the second urethane (meth)acrylate oligomer having 4 or less functional groups.

Hereinafter, the ultraviolet (UV)-curable coating composition is described in detail.

Urethane (Meth)Acrylate Oligomer

In the ultraviolet-curable coating composition of the present invention, a urethane (meth)acrylate oligomer is a main component for forming a coating layer, and controls the crosslinking density of the entire coating layer to serve to express the strength, high-temperature durability and adhesion of a hard-coating layer.

In the present invention, as the urethane (meth)acrylate oligomer, the first urethane (meth)acrylate oligomer having 5 or more functional groups and the second urethane (meth)acrylate oligomer having 4 or less functional groups are mixed and used. When two or more urethane (meth)acrylate oligomers are used as described above, the solid content in a coating is increased to exhibit excellent coating properties in terms of heat resistance, weather resistance and hardness.

The first urethane (meth)acrylate oligomer may have 5 or more (for example, 5 to 16) polymerizable functional groups, for example, 6 or more (for example, 6 to 10) polymerizable functional groups, or 6 polymerizable functional groups in another example, which are polymerizable unsaturated groups. The weight average molecular weight (Mw) of the first urethane (meth)acrylate oligomer may be 800-2,500 g/mol, and may be, for example, 1,000-2,000 g/mol. When the first urethane (meth)acrylate oligomer has the weight average molecular weight range described above, reactivity is excellent and a dry coating layer has excellent properties such as heat resistance, weather resistance, and hardness.

The second urethane (meth)acrylate oligomer may have 4 or less (for example, 1 to 4) polymerizable functional groups, for example, 3 or less (for example, 2 to 3) polymerizable functional groups, or 3 polymerizable functional groups in another example. The weight average molecular weight (Mw) of the second urethane (meth)acrylate oligomer may be 1,500-3,000 g/mol, and for example, may be 1,700-2,300 g/mol. When the second urethane (meth)acrylate oligomer has the weight average molecular weight range described above, a dry coating layer has excellent properties such as heat resistance, weather resistance, and adhesion.

According to one embodiment of the present invention, the mixing ratio of the first urethane (meth)acrylate oligomer having 5 or more functional groups and the second urethane (meth)acrylate oligomer having 4 or less functional groups may be 1-3:1 weight ratio.

In the present invention, the content of the urethane (meth)acrylate oligomer is not particularly limited, and may be, for example, 30-50 wt % based on the total weight of the ultraviolet-curable coating composition. When the content of the urethane (meth)acrylate oligomer is within the aforementioned range, excellent strength and heat resistance of a coating layer are exhibited and adhesion with a substrate is improved.

As an example, in the present invention, when the first urethane (meth)acrylate oligomer and the second urethane (meth)acrylate oligomer are mixed and used, the content of the first urethane (meth)acrylate oligomer may be 20-30 wt % and the content of the second urethane (meth)acrylate oligomer may be 10-20 wt % based on the total weight of the ultraviolet-curable coating composition.

(Meth)Acrylate Monomer

In the ultraviolet-curable coating composition of the present invention, the (meth)acrylate monomer serves as a cross-linking agent for controlling the cross-linking density among polymers, and serves to assist the curing properties, such as hardness, adhesion, appearance properties of a coating layer, and workability.

In the present invention, as the (meth)acrylate monomer, the first (meth)acrylate monomer having 3 or more functional groups, the second (meth)acrylate monomer having 2 or less functional groups, or a mixture thereof may be used. By using two or more kinds of multifunctional (meth) acrylate monomers of 2 or less functional (meth)acrylate monomers and 3 or more functional (meth)acrylate monomers, it is possible to adjust the workability, appearance properties, and curing degree of a coating.

The first (meth)acrylate monomer may have 3 or more (for example, 3 to 10) polymerizable functional groups, for example, 3 to 5 polymerizable functional groups in a molecule. The weight average molecular weight (Mw) of the first (meth)acrylate monomer may be 100-300 g/mol, and the glass transition temperature (Tg) thereof may be 40-80° C.

Non-limiting examples of the first (meth)acrylate monomer which may be used include trimethylolpropane triacrylate (TMPTA), trimethylolpropane trimethacrylate (TMPTMA), trimethylolpropaneethoxy triacrylate (TMPEOTA), pentaerythritol triacrylate (PETA), glycerylpropoxylated triacrylate (GPTA), pentaerythritol tetraacrylate (PETTA), dipentaerythritol pentaacrylate (DPPA), dipentaerythritol hexaacrylate (DPHA), or a combination thereof.

As the second (meth)acrylate monomer having 2 or less functional groups, a known (meth)acrylate monomer containing 2 or less, for example, 2 polymerizable functional groups in a molecule may be used without limitation. The second (meth)acrylate monomer is suitable in that the viscosity thereof is low, and thus, the dilution force is good, thereby having a low polymerization shrinkage after curing.

The weight average molecular weight (Mw) of the second (meth)acrylate monomer may be 100-250 g/mol, and the glass transition temperature (Tg) thereof may be 30-100° C.

Non-limiting examples of the second (meth)acrylate monomer which may be used include 1,6-hexanediol diacrylate (HDDA), 1,6-hexanediol dimethacrylate (HDDMA), butanediol diacrylate (BDDA), tripropylene glycol diacrylate (TPGDA), triethylene glycol diacrylate (TEGDA), neopentylglycol diacrylate (NPGDA), polyethylene glycol 400 diacrylate (PEG400DA), polyethylene glycol 200 diacrylate (PEG200DA), dipropylene glycol diacrylate (DPGDA), tetraethylene glycol diacrylate (TTEGDA), tetraethylene glycol dimethacrylate (TTEGDMA), 9-ethylene glycol diacrylate (9-EGDA), triethylene glycol dimethacrylate (TEGDMA), and a combination thereof.

In the present invention, the first (meth)acrylate monomer having 3 or more functional groups and the second (meth)acrylate monomer having 2 or less functional groups may be mixed and used. At this time, the mixing ratio of the first (meth)acrylate monomer and the second (meth)acrylate monomer may be 1-2:1 weight ratio.

In the present invention, the content of the (meth)acrylate monomer is not particularly limited, and may be, for example, 10-25 wt % based on the total weight of the ultraviolet-curable coating composition. When the content of the (meth)acrylate monomer is within the aforementioned range, the high-temperature adhesion of a coating layer is improved, excellent strength, heat resistance, and appearance properties thereof are exhibited, and adhesion with another substrate may be improved.

As an example, in the present invention, when the first (meth)acrylate monomer and the second (meth)acrylate monomer are mixed and used, the content of the first (meth)acrylate monomer may be 5-13 wt % and the content of the second (meth)acrylate monomer may be 5-12 wt % based on the total weight of the ultraviolet-curable coating composition.

According to one embodiment of the present invention, the weight ratio of the urethane (meth)acrylate oligomer and the (meth)acrylate monomer may be 1-4:1, and may be, for example, 1-3:1.

Photoinitiator

In the ultraviolet-curable coating composition of the present invention, a photoinitiator is a component which is excited by ultraviolet (UV) light and the like to serve to initiate photopolymerization, and a typical photopolymerization initiator of the art may be used without limitation.

Non-limiting examples of the photoinitiator which may be used include Irgacure 184, Irgacure 369, Irgacure 651, Irgacure 819, Irgacure 907, benzionalkylether, benzophenone, benzyl dimethyl katal, hydroxycyclohexyl phenylacetone, chloroacetophenone, 1,1-dichloro acetophenone, diethoxy acetophenone, hydroxy acetophenone, 2-chloro thioxanthone, 2-ethylanthraquinone (2-EAQ), 1-hydroxycyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, and the like. The above compounds may be used alone or in combination of two or more thereof.

According to one embodiment of the present invention, as the photoinitiator, a short wavelength initiator which absorbs ultraviolet light of 230-340 nm wavelength, a long wavelength initiator which absorbs ultraviolet light of greater than 300 nm wavelength, or a combination thereof may be used.

In the present invention, the content of the photoinitiator may be 1-5 wt % based on the total weight of the ultraviolet-curable coating composition. When the content of the photoinitiator is within the aforementioned range, a photopolymerization reaction may be sufficiently performed without the deterioration in the properties of a coating layer.

Solvent

The ultraviolet-curable coating composition of the present invention comprises an organic solvent typically used in a coating composition of the art. The solvent serves to dilute the above-mentioned coating composition to a predetermined viscosity to enable coating.

Non-limiting examples of the solvent which may be used include an alcohol such as methoxy propanol and isopropyl alcohol, a ketone such as acetone, an acetate such as ethyl acetate, and an aromatic compound such as toluene, and the above compounds may be used alone or in combination thereof.

In the present invention, the content of the solvent may be a remaining amount which satisfies 100 wt % of the ultraviolet-curable coating composition, and may be, for example, 20-40 wt % based on the total weight of the composition. When the content of the solvent is out of the aforementioned range, workability and leveling may be reduced and the formation of a coating layer may be deteriorated.

Additives

In addition to the above-mentioned components, the ultraviolet-curable coating composition of the present invention may use additives known in the art without limitation in the range that does not deteriorate the effect of the invention. By using one or more among an ultraviolet absorber, a light stabilizer, a silicon-based leveling agent, and the like as the additive, the smoothness of a coating, the appearance properties, weather resistance of a coating layer, and the like may be improved.

The ultraviolet-curable coating composition of the present invention includes a typical ultraviolet absorber known in the art. The ultraviolet absorber is a component introduced to improve weather resistance in both a long wavelength region and a short wavelength region (for example, UV-A, UV-B, and UV-C regions), particularly in a short wavelength region of 300 nm or less (for example, UV-B and UV-C regions) of a coating layer.

In the present invention, the ultraviolet absorber may be a triazine-based ultraviolet absorber having two or more ultraviolet absorbing groups. For example, a hydroxy phenyl triazine derivative having two or more ultraviolet absorbent ester groups may be used alone or in combination of two or more thereof.

The molecular weight of the ultraviolet absorber may be 500 g/mol or greater (for example, 500-2,000 g/mol). When the molecular weight of the ultraviolet absorber is less than 500 g/mol, volatility and extractability are large so that it is difficult for an ultraviolet absorber component to remain in a coating layer when exposed to the outdoors, thereby deteriorating the durability and weather resistance of the coating layer.

In the present invention, the content of the ultraviolet absorber may be 1-5 wt % based on the total weight of the ultraviolet-curable coating composition. When the content of the ultraviolet absorber is out of the aforementioned range, it is difficult to obtain an effect of improving the weather resistance of a coating layer, and curing failure may be caused during ultraviolet curing.

Examples of other additives which may be used include a light stabilizer (e.g., HALS), an antioxidant (e.g., a phenolic antioxidant), a wetting agent (e.g., polyether-modified polydimethylsiloxane), a leveling agent (e.g., silicone diacrylate-based or a silicone polyacrylate-based compound), a lubricant, a surface conditioner, a surfactant, an anti-foaming agent (e.g., dimethylpolysiloxane), a slip agent, a stain inhibitor, a softener, a thickener, a polymer, and the like. The above compounds may be used alone or in combination of two or more thereof. The above additives enhance the workability of a coating and the smoothness of a coating layer.

In the present invention, the content of the additive may be appropriately controlled within a range known in the art. As an example, it is preferable that the amount of each of the additives used does not exceed 5 wt % with respect to 100 wt % of the ultraviolet-curable coating composition.

According to one embodiment of the present invention, the ultraviolet-curable coating composition comprises, based on 100 wt % of the composition, 30-50 wt % of the urethane (meth)acrylate oligomer, 10-25 wt % of the (meth)acrylate monomer, 1-5 wt % of the photoinitiator, and with the balance being the solvent.

According to another embodiment of the present invention, the ultraviolet-curable coating composition comprises, based on 100 wt % of the composition, 20-30 wt % of the first urethane (meth)acrylate oligomer having 5 or more functional groups, 10-20 wt % of the second urethane (meth)acrylate oligomer having 4 or less functional groups, 5-13 wt % of the first (meth)acrylate monomer having 3 or more functional groups, 5-12 wt % of the second (meth)acrylate monomer having 2 or less functional groups, 1-5 wt % of a photoinitiator, 1-5 wt % of an ultraviolet absorber (e.g., HPT), 0.5-3 wt % of a light stabilizer (e.g., HALS), 0.5-3 wt % of a wetting agent (e.g., polyether modified polydimethylsiloxane), and 20-40 wt % of a solvent (e.g., 1-methoxy-2-propanol).

The ultraviolet-curable coating composition of the present invention comprising the aforementioned components may be of a high solid type having a solid content of 70% or greater.

A method for manufacturing the ultraviolet-curable coating composition of the present invention is not particularly limited. As an example, the ultraviolet-curable coating composition may be manufactured by a typical method in which the two kinds of urethane (meth)acrylate oligomers, the (meth)acrylate monomer, the photoinitiator, the solvent, and one or more additives described above are added to a mixing equipment such as a dissolver, a stirrer, and the like, and then mixed at an appropriate temperature (for example, room temperature).

The ultraviolet-curable coating composition of the present invention may be applied to coating a component of a vehicle headlamp, such as a headlamp lens. However, the present invention is not particularly limited thereto, and may be applied to various process steps and applications.

<Molded Product>

The present invention provides a molded product comprising a cured coating layer formed from the ultraviolet-curable coating composition described above. The molded product may be a molded product for a vehicle, for example, a vehicle head lamp (PC lens).

According to one embodiment of the present invention, the vehicle head lamp comprises a plastic substrate and a cured coating layer formed on one surface or both surfaces of the plastic substrate and formed from the ultraviolet-curable coating composition described above.

As the plastic substrate, a typical substrate used in the head lamp field may be used without limitation, and examples thereof include a thermoplastic plastic, a thermosetting plastic, and the like. Non-limiting examples of the plastic substrate which may be used include polymethyl methacrylate (PMMA), polyethylene terephthalate (PET), polyethylene naphthalate (PEN), triacetyl cellulose (TAC), polycarbonate (PC), polyimide (PI), polyethylene (PE), polypropylene (PP), polyether sulfone (PES), polyvinyl alcohol (PVA), polyvinyl chloride (PVC), or a combination of two or more thereof, and the like. When the plastic substrate described above is used, the initial and high-temperature adhesion to the ultraviolet-curable coating composition of the present invention is excellent.

The thickness of a cured coating layer made of the composition may be variously adjusted depending on the application, and may be, for example, in the range of 5-25 μm, or in the range of 5-20 μm in another example. When the cured coating layer has a thickness in the range described above, the adhesion to a surface of a plastic substrate may be excellent and appearance defects may be prevented.

According to one embodiment of the present invention, the ultraviolet-curable coating composition is applied and dried on a surface of a plastic substrate, and then cured by ultraviolet irradiation to form a cured coating layer.

As a method for applying the ultraviolet-curable coating composition on a plastic substrate, a typical applying method of the art, for example, spray coating, brushing, flow coating, dip coating, spin coat, and the like, may be employed. The amount of ultraviolet radiation is not particularly limited, and may be, for example, in the range of 500-3,000 mJ/cm$^2$.

The plastic substrate on which the cured coating layer is formed as described above may be a vehicle head lamp, and may be, for example, a lens of a head lamp having the cured coating layer formed on the surface thereof. The head lamp has excellent adhesion to a plastic substrate (for example, a PC material), and is excellent in the overall properties of a coating layer, such as appearance, heat resistance, moisture resistance, heat and cold resistance.

Hereinafter, the present invention will be described in more detail with reference to examples. However, the following examples are merely illustrative of the present invention and are not intended to limit the scope of the present invention.

Examples 1-12

An ultraviolet-curable coating composition of each of Examples 1 to 12 was manufactured using a 6 functional urethane acrylate oligomer (A), a 3 functional urethane acrylate oligomer (B), a 2 functional or 3 functional (meth) acrylate monomer (C), a photoinitiator (D), an ultraviolet absorber (E), a light stabilizer (F), a silicone additive (G), a solvent (H), and the like according to the composition shown in Table 1 below. In Table 1 below, the amount of usage of each component is expressed by weight %.

Comparative Examples 1-12

An ultraviolet-curable coating composition of each of Comparative Examples 1 to 12 was manufactured using a 6 functional urethane acrylate oligomer (A), a 3 functional urethane acrylate oligomer (B), a 2 functional or 3 functional (meth)acrylate monomer (C), a photoinitiator (D), an ultraviolet absorber (E), a light stabilizer (F), a silicone additive (G), a solvent (H), and the like according to the composition shown in Table 2 below.

TABLE 1

| Component | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| A | A-1 | 29 | 29 | 29 | — | — | — | 26 | — | 29 | — | 30 | — |
|  | A-2 | — | — | — | 29 | 29 | 29 | — | 31 | — | 29 | — | 25.4 |
|  | B | 14 | 14 | 14 | 14 | 14 | 14 | 17 | 12 | 14 | 14 | 15 | 12.6 |
| C | C-1 | 8 | 8 | 8 | 8 | 8 | 8 | 8 | 8 | 7 | 6 | 7.1 | 10.2 |
|  | C-2 | 10 | 10 | 10 | 10 | 10 | 10 | 10 | 10 | 11 | 12 | 8.9 | 12.8 |
|  | D | 1 | 3 | 5 | 1 | 3 | 5 | 1 | 1 | 3 | 3 | 5 | 5 |
|  | E | 3 | 3 | 3 | 3 | 3 | 3 | 3 | 3 | 3 | 3 | 3 | 3 |
|  | F | 1 | 1 | 1 | 1 | 1 | 1 | 1 | 1 | 1 | 1 | 1 | 1 |
|  | G | 1 | 1 | 1 | 1 | 1 | 1 | 1 | 1 | 1 | 1 | 1 | 1 |
|  | H | 33 | 31 | 29 | 33 | 31 | 29 | 33 | 33 | 31 | 31 | 29 | 29 |
| TOTAL | | 100 | 100 | 100 | 100 | 100 | 100 | 100 | 100 | 100 | 100 | 100 | 100 |

TABLE 2

| Component | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| A | A-1 | 27 | — | 19 | — | 29 | — | 12.1 | — | — | 29 | 29 | 29 |
| | A-2 | — | 27 | — | 33 | — | 29 | — | 33.7 | — | — | — | — |
| | B | 6 | 6 | 24 | 10 | 14 | 14 | 5.9 | 16.3 | 20 | — | 18 | 14 |
| C | C-1 | 4.5 | 4.5 | 8 | 8 | 10 | 5 | 19.1 | 4.8 | 12 | 11 | — | 11 |
| | C-2 | 6 | 6 | 10 | 10 | 8 | 13 | 23.9 | 6.2 | 13 | 12 | 10 | — |
| | D | 2 | 2 | 1 | 1 | 3 | 3 | 5 | 5 | 5 | 4 | 5 | 3 |
| | E | 2.1 | 2.1 | 3 | 3 | 3 | 3 | 3 | 3 | 4 | 3 | 3 | 3 |
| | F | 0.7 | 0.7 | 1 | 1 | 1 | 1 | 1 | 1 | 3 | 2 | 1 | 1 |
| | G | 0.7 | 0.7 | 1 | 1 | 1 | 1 | 1 | 1 | 3 | 1 | 1 | 1 |
| | H | 51 | 51 | 33 | 33 | 31 | 31 | 29 | 29 | 40 | 38 | 33 | 38 |
| TOTAL | | 100 | 100 | 100 | 100 | 100 | 100 | 100 | 100 | 100 | 100 | 100 | 100 |

A-1: 6-functional urethane acrylate oligomer (Mw: 1,800, viscosity (25° C.): 100,000 cps, specific gravity: 1.19, NV: 100, refractive index: 1.496)

A-2: 6-functional urethane acrylate oligomer (Mw: 1,000, viscosity (60° C.): 2,000 cps, glass transition temperature: 69° C., density: 1.15 g/m$^3$ B: 3-functional urethane acrylate oligomer (Mw: 2,000, acid value: 1 mgKOH/g, density:
1.15 g/m$^3$, NV: 100)

C-1: 2-functional (meth)acrylate monomer (1,6-hexanediol diacrylate)

C-2: 3-functional (meth)acrylate monomer (Trimethylolpropane triacrylate, TMPTA)

D: Photoinitiator (1-Hydroxy-cyclohexyl-phenyl-ketone, trade name: Micure CP-4, Miwon Corporation)

E: Ultraviolet absorber (Hydroxyphenyl Triazines, HPT)

F: Light stabilizer (HALS, TINUVIN123, BASF)

G: Silicone additive (BYK-333, BYK)

H: Solvent (1-Methoxy-2-propanol)

Experimental Example. Evaluation of Properties of Ultraviolet-Curable Coating Composition for Vehicle Headlamp The ultraviolet-curable coating composition manufactured in each of Examples 1 to 12 and Comparative Examples 1 to 12 was air spray coated on a transparent polycarbonate specimen (PC) to a thickness of about 12 μm (Top layer, based on a dry coating layer thickness), and then dried at a temperature of 80° C. for about 300 seconds to remove the solvent. Thereafter, the specimen was subjected to irradiation with an energy of 3,500 mJ/cm$^2$ at a position of about 20 cm in the air with a high-pressure mercury lamp of 180 mW/cm$^2$ to manufacture a specimen for testing properties.

The properties of the items as listed in Table 3 were evaluated for the manufactured specimens, and the results are shown in Table 4 and Table 5 below.

TABLE 3

| Items | Evaluation method |
|---|---|
| Adhesion test | Evaluated by performing a cross cut tape test in accordance with ASTM D3359 |
| Moisture resistance test | The specimen was left for 240 hours under the condition of 50 ± 2° C. and 98 ± 2%, and then taken out and left for 1 hour for observation. A coating layer was evaluated for whether there was no significant discoloration, fading, swelling, cracking, gloss deterioration, and the like and whether there was any abnormality in adhesion. |
| Water resistance test | The specimen was deposited in water for 240 hours under the condition of 40 ± 2° C., taken out to remove moisture, and then left for 1 hour for observation. A coating layer was evaluated for whether there was no significant discoloration, fading, swelling, cracking, gloss deterioration, and the like and whether there was any abnormality in adhesion. |
| Heat resistance test | The specimen was left for 72 hours under the condition of 200 ± 2° C. and then left for 1 hour at room temperature. A coating layer was evaluated for whether there was no significant discoloration, fading, swelling, cracking, gloss deterioration, and the like and whether there was any abnormality in adhesion. |
| Heat and cold resistance cycle test | A series of steps in which the specimen was left for 4 hours under the condition of 80 ± 2° C. and 95% RH and then left for 4 hours under the condition of −40 ± 2° C. and 95% RH was repeated for 5 times, and then the specimen was left for 1 hour at room temperature. A coating layer was evaluated for whether there was no significant discoloration, fading, swelling, cracking, gloss deterioration, and the like and whether there was any abnormality in adhesion. |
| Appearance | Evaluated for defects such as discoloration, gloss deterioration, sagging, and orange peel, which are visually identifiable with the naked eye. |
| Weather resistance test | Evaluated for cracks after a weather resistance test (Measuring device: Weather-O-Meter, Eye Super UV each Ci 5000, ATLAS, SUV-W151, IWASAKI ELECTRIC). Target ΔE: less than 3.0 |
| Solid content (NV) | SATORIUS Co., Ltd., MARK 3 Standby (60□) → Sample (1.5 g) → heating (70□) → Solid content (wt %) check |
| Evaluation criteria | Excellent (⊚), Normal (○), Bad (X) |

TABLE 4

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Initial adhesion | 100/100 | 100/100 | 100/100 | 100/100 | 100/100 | 100/100 | 100/100 | 100/100 | 100/100 | 100/100 | 100/100 | 100/100 |
| Moisture resistance | ⊚ | ⊚ | ⊚ | ⊚ | ⊚ | ⊚ | ⊚ | ⊚ | ⊚ | ⊚ | ⊚ | ⊚ |
| Water resistance | ⊚ | ⊚ | ⊚ | ⊚ | ⊚ | ⊚ | ⊚ | ⊚ | ⊚ | ⊚ | ⊚ | ⊚ |
| Heat resistance | ⊚ | ⊚ | ⊚ | ⊚ | ⊚ | ⊚ | ⊚ | ⊚ | ⊚ | ⊚ | ⊚ | ⊚ |
| Heat and cold cycle resistance | ⊚ | ⊚ | ⊚ | ⊚ | ⊚ | ⊚ | ⊚ | ⊚ | ⊚ | ⊚ | ⊚ | ⊚ |
| Appearance evaluation (Migration) | ⊚ | ⊚ | ⊚ | ⊚ | ⊚ | ⊚ | ⊚ | ⊚ | ⊚ | ⊚ | ⊚ | ⊚ |
| Weather resistance (ΔE) | 2.2 | 2.3 | 2.7 | 2.9 | 2.9 | 2.7 | 2.4 | 2.9 | 2.9 | 2.9 | 2.7 | 2.9 |
| Weather resistance (crack) | ⊚ | ⊚ | ⊚ | ⊚ | ⊚ | ⊚ | ⊚ | ⊚ | ⊚ | ⊚ | ⊚ | ⊚ |
| NV | 70 | 70 | 70 | 70 | 70 | 70 | 70 | 70 | 70 | 70 | 70 | 70 |

TABLE 5

| | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Initial adhesion | 100/100 | 100/100 | 100/100 | 100/100 | 100/100 | 100/100 | 100/100 | 100/100 | 70/100 | 70/100 | 100/100 | 90/100 |
| Moisture resistance | ⊚ | ⊚ | Δ | Δ | Δ | Δ | Δ | Δ | ○ | ○ | ○ | ○ |
| Water resistance | ⊚ | ⊚ | ○ | Δ | ○ | ○ | ○ | ○ | ○ | Δ | ○ | ○ |
| Heat resistance | ⊚ | ⊚ | ○ | ○ | ○ | ○ | ○ | ○ | Δ | Δ | ○ | Δ |
| Heat and cold cycle resistance | ⊚ | ⊚ | Δ | Δ | ○ | Δ | Δ | Δ | Δ | Δ | ○ | ○ |
| Appearance evaluation (migration) | ⊚ | ⊚ | ○ | ○ | ○ | ○ | ○ | ○ | ○ | ○ | Δ | Δ |
| Weather resistance (ΔE) | 3.1 | 4.9 | 3.4 | 3.9 | 3.4 | 4.2 | 4.1 | 4.6 | 4.2 | 4.5 | 3.4 | 3.3 |
| Weather resistance (crack) | ⊚ | Δ | Δ | Δ | ○ | ○ | Δ | Δ | ○ | ○ | ○ | ○ |
| NV | 50 | 50 | 70 | 70 | 70 | 70 | 70 | 70 | 40 | 40 | 65 | 65 |

Through the above-described experimental results, it can be seen that the molded product provided with the cured coating layer formed from the ultraviolet-curable coating composition according to the present invention is excellent in appearance, initial adhesion, heat resistance, moisture resistance, and heat and cold resistance. In addition, the ultraviolet-curable coating composition according to the present invention is environmentally friendly by minimizing the content of volatile organic compounds (VOC) since it is a high solid type coating.

INDUSTRIAL AVAILABILITY

The present invention relates to a high solid type ultraviolet-curable coating composition and a molded product comprising a cured coating layer formed using the same. The present invention provides an eco-friendly UV-curable coating composition having less generation of volatile organic compounds.

What is claimed is:

1. An ultraviolet-curable coating composition comprising a urethane (meth)acrylate oligomer, a (meth)acrylate monomer, a photoinitiator, and a solvent,
   wherein the urethane (meth)acrylate oligomer comprises a first urethane (meth)acrylate oligomer having 6 functional groups and a second urethane (meth)acrylate oligomer having 3 functional groups, and
   the (meth)acrylate monomer comprises a first (meth)acrylate monomer having 3 or more functional groups and a second (meth)acrylate monomer having 2 or less functional groups, and wherein the weight average molecular weight (Mw) of the second urethane (meth)acrylate oligomer is 1,500 to 3,000 g/mol.

2. The ultraviolet-curable coating composition of claim 1, wherein a weight ratio of the urethane (meth)acrylate oligomer and the (meth)acrylate monomer is 1-4:1.

3. The ultraviolet-curable coating composition of claim 1, wherein a weight ratio of the first urethane (meth)acrylate oligomer and the second urethane (meth)acrylate oligomer is 1-3:1.

4. The ultraviolet-curable coating composition of claim 1, wherein the first (meth)acrylate monomer and the second (meth)acrylate monomer are mixed in a 1-2:1 weight ratio.

5. The ultraviolet-curable coating composition of claim 1, which comprises 30-50 wt % of the urethane (meth)acrylate oligomer, 10-25 wt % of the (meth)acrylate monomer, 1-5 wt % of the photoinitiator, with a balance being the solvent, based on 100 wt % of the composition.

6. The ultraviolet-curable coating composition of claim 1, which is a high solid type coating composition having a solid content of 70% or greater.

7. A molded product comprising a cured coating layer formed from the ultraviolet-curable coating composition according to claim 1.

8. A molded product comprising a cured coating layer formed from the ultraviolet-curable coating composition according to claim 2.

9. A molded product comprising a cured coating layer formed from the ultraviolet-curable coating composition according to claim 3.

10. A molded product comprising a cured coating layer formed from the ultraviolet-curable coating composition according to claim 4.

11. A molded product comprising a cured coating layer formed from the ultraviolet-curable coating composition according to claim 5.

12. A molded product comprising a cured coating layer formed from the ultraviolet-curable coating composition according to claim 6.

* * * * *